United States Patent [19]

Penkov et al.

[11] Patent Number: 6,129,868
[45] Date of Patent: Oct. 10, 2000

[54] FAST PROCESS FOR THE PRODUCTION OF FIBER PREFORMS

[75] Inventors: Igor Alexandrovich Penkov; Innokentii Victorovich Kulakov; Valery Ivanovich Kostikov; Aleksandr Viktorovich Demin, all of Moscow, Russian Federation

[73] Assignee: AlliedSignal Inc., Morristown, N.J.

[21] Appl. No.: 09/194,042

[22] PCT Filed: Mar. 9, 1998

[86] PCT No.: PCT/US98/04561

§ 371 Date: Mar. 25, 1999

§ 102(e) Date: Mar. 25, 1999

[87] PCT Pub. No.: WO98/41488

PCT Pub. Date: Sep. 24, 1998

[30] Foreign Application Priority Data

Mar. 19, 1997 [RU]  Russian Federation ............. 97105038

[51] Int. Cl.[7] ..................................................... C01B 31/02
[52] U.S. Cl. ................... 264/29.7; 423/447.2; 423/447.8
[58] Field of Search ........................ 264/29.7; 423/447.2, 423/447.8; 428/408

[56] References Cited

U.S. PATENT DOCUMENTS

| | | |
|---|---|---|
| 4,026,745 | 5/1977 | Hatch et al. . |
| 4,847,021 | 7/1989 | Montgomery et al. . |
| 5,114,635 | 5/1992 | Sohda et al. . |
| 5,205,888 | 4/1993 | Mochida et al. . |
| 5,382,392 | 1/1995 | Prevorsek et al. . |
| 5,569,417 | 10/1996 | Singer et al. . |

FOREIGN PATENT DOCUMENTS

| | | |
|---|---|---|
| 297695 A2 | 1/1989 | European Pat. Off. . |
| 656331 A2 | 6/1995 | European Pat. Off. . |
| 539 476 B1 | 5/1998 | European Pat. Off. . |
| 2714364 | 10/1978 | Germany . |
| 3921980 | 1/1990 | Germany . |

OTHER PUBLICATIONS

Abstract of Japan 62–212263 (Sep. 18, 1987).

*Primary Examiner*—Leo B. Tentoni
*Attorney, Agent, or Firm*—Larry J. Palguta

[57] ABSTRACT

A thermomechanical pressing ("TMP") method for obtaining rapidly a high density (1.2 g/cm$^3$ or higher) carbon/carbon composite preform from any carbon fiber including PAN-based carbon fibers and industrial coal-tar or petroleum pitches (including synthetic derivatives) having a melting point m.p.=80–350° C. Green preforms may be prepared from mixtures of carbon fibers and pitch, and the resulting mixture is formed to impart a cylindrical shape to the green preform. The green preform is charged into a metallic mold where it is heated, stabilized, pressurized for a period of time, and cooled.

12 Claims, 4 Drawing Sheets

FAST PROCESS FOR THE PRODUCTION OF FIBER PREFORMS

The present invention relates generally to the rapid fabrication of high density carbon-carbon composites or preforms used for friction materials and thermal management systems for automotive and aerospace applications.

BACKGROUND OF THE INVENTION

One way to improve the production efficiency of carbon-carbon composite materials is the development of processes which take advantage of the benefits of pitch matrix precursors. The main advantages of pitch matrices reside in their high carbon content (90% and more), relatively short process steps, as well as specific material properties resulting from their high graphitizability, which provide high thermal conductivity, density and good friction and wear performance.

It is highly desirable to provide rapidly a preform or composite with high density (1.2 g/cm$^3$ and above) prior to densification by conventional precursor carbon methods: carbon vapor deposition or densification ("CVD") and also called carbon vapor infiltration ("CVI"), pitch or resin and their combinations.

SUMMARY OF THE INVENTION

The present invention provides solutions to the above by providing a method of producing rapidly a carbon-carbon composite made from a green preform comprising carbon fibers and at least one pitch, comprising the steps of:
 (a) heating the green preform to a temperature of approximately 450° C., then increasing the temperature at a lesser rate up to approximately 520° C.;
 (b) holding at a temperature within the range of approximately 450–520° C. for a period of time;
 (c) pressing the preform at approximately 520° C. or higher;
 (d) heating the preform to within the range of approximately 520° C.–1,000° C. followed by a soak; and
 (e) cooling to provide the composite.

We have disclosed a thermomechanical pressing ("TMP") method for obtaining rapidly a carbon/carbon composite material using any carbon fiber including polyacrylonitrile ("PAN") based carbon fibers and industrial coal-tar or petroleum pitches (including synthetic derivatives) having a melting point m.p.=80–350° C. Generally, a green preform may be prepared from mixtures of chopped carbon fibers and pitch, for example a mixture prepared from 1 part by weight of carbon fibers chopped to the length of Lf=10–50 mm and 1–3 parts by weight of pitch. The resulting mixture is pressed to impart a cylindrical shape to the green preform. The green preform is charged into a metallic mold where it is heated, pressurized, stabilized, and cooled.

BRIEF DESCRIPTION OF THE DRAWINGS

The invention is described in detail below with reference to the drawings in which.

DETAILED DESCRIPTION OF THE INVENTION

Figure 1:
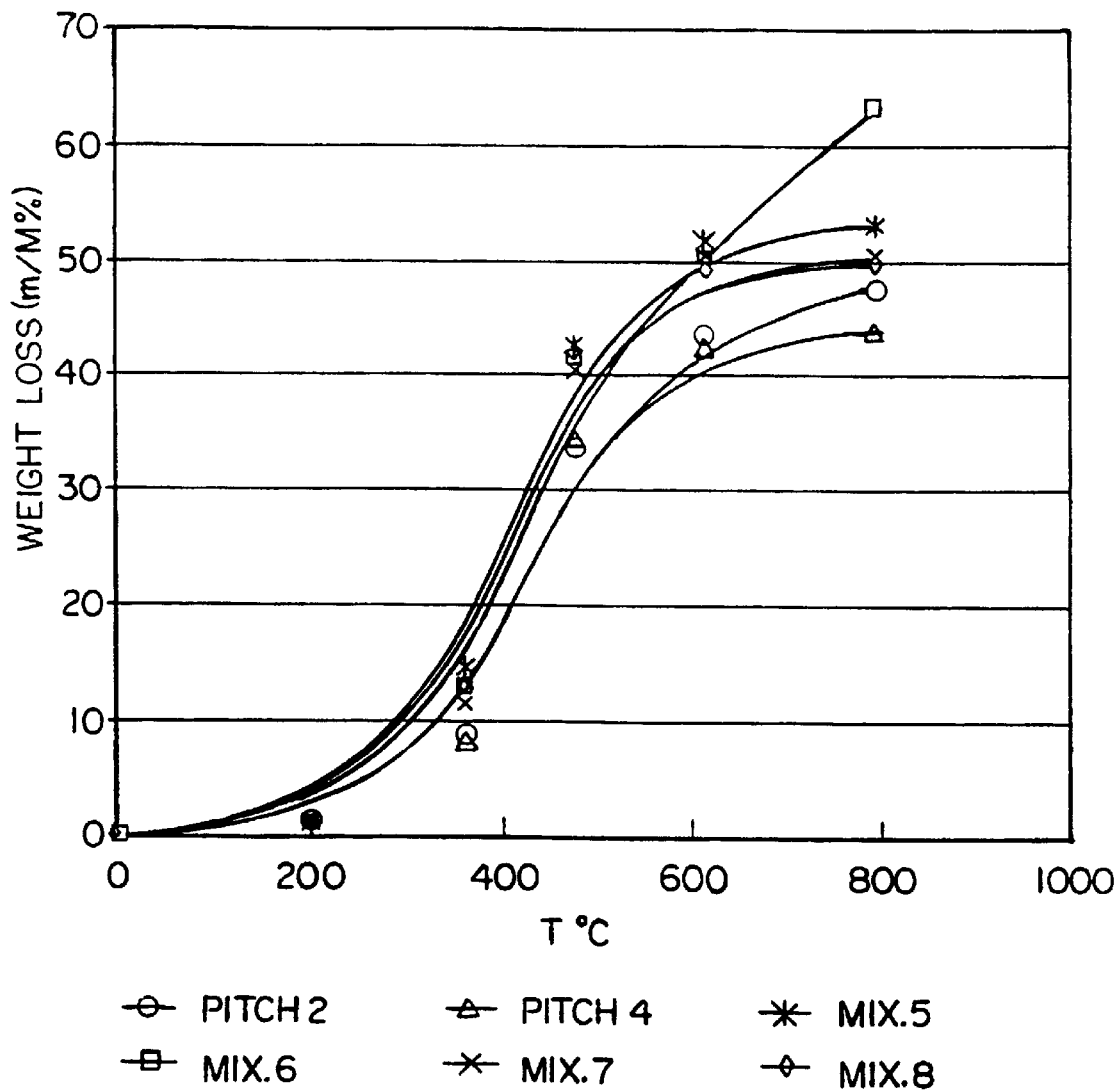
FIG. 1 is a graph of the thermal decomposition of coal tar petroleum pitches and mixtures.

Among processes for improving the production efficiency of pitch-based carbon-carbon composite materials, we think it expedient, with regard to the requirements for friction materials, to use thermal stabilization methods in combination with a forced mechanical contraction or pressing of the material during pyrolysis. The method developed is referred to as thermomechanical pressing ("TMP").

A pitch matrix and PAN fiber reinforcement were chosen for the TMP process. At present, commercially produced coal tar pitches have softening points Ts=65–75° C. and Ts=135–140° C. and toluene insolubles ($\alpha$-fraction) content of 20–25 wt. % and 45–54 wt. %, respectively, for medium and high-temperature pitches.

Medium pitches enable the preparation of high-quality "green" bodies with a low coke yield. High-temperature pitches have a higher coke residue of about 55–60%, but their use presents difficulties because at temperatures of 120–280° C. they do not wet carbon substrates thus preventing the use of conventional methods to press "green" bodies.

Therefore, it is of interest to determine if an industrial petroleum pitch with Ts=140° C. can be used in TMP processes. Such pitches have coke residue somewhat lower than a high-temperature coal tar pitch, but considerably higher than a medium pitch and experimental coal tar pitch with Ts=101° C. and $\alpha$-fraction content of 33.6 wt. %. It was found that the industrial petroleum pitch exhibited better wetting ability compared to high-temperature coal-tar pitches.

In addition, high-temperature petroleum and medium coal-tar pitches were mixed by comelting and the resulting mixtures were studied in an effort to improve wetting characteristics without essential loss in the coke residue yield.

Based on laboratory results, mixtures of high-temperature petroleum and medium coal-tar pitches were prepared by comilling, and the softening temperature of the mixtures of pitches was approximately 100–110° C.

The following pitches and their mixtures were investigated:
1. Pitch grade "A" GOST 10200-83, a medium coal tar pitch, Ts=74° C.
2. An experimental coal tar pitch with elevated softening temperature, Ts=101° C.
3. Pitch grade "I" specs. 14-6-84-72, a high-temperature coal tar pitch, Ts=140° C.
4. Pitch grade "IIHII CB" specs. 48-4807-287-94, a high-temperature petroleum pitch, Ts=140° C.
5. mixture of pitches 1 and 4 in the ratio 0.5:0.5 a laboratory sample
6. mixture of pitches 1 and 4 in the ratio 0.3:0.7 a laboratory sample
7. mixture of pitches 1 and 4 in the ratio 0.45:0.55 an industrial sample
8. mixture of pitches 1 and 3 in the ratio 0.5:0.5 a laboratory sample The composition and properties of pitches were characterized in terms of the softening point, coke residue yield, and toluene insoluble fraction content. In addition, the molecular weight distribution, thermal decomposition behavior in the temperature range from 200 to 800° C. and the onset wetting temperature of carbon substrate (at a 90 deg. contact angle) were also determined. Pitch characteristics are presented in Table A.

TABLE A

Composition and properties of the pitches.

| Property | _____ Numbers of pitches _____ | | | | | | | |
|---|---|---|---|---|---|---|---|---|
| | 1 | 2 | 3 | 4 | 5 | 6 | 7 | 8 |
| Softening point ° C. (Ring and rod) | 74 | 101 | 140 | 140 | 120 | 118 | 110 | 99 |
| Coke residual, % | 36.3 | 48.0 | 60.0 | 52.6 | 44.5 | 47.6 | 48.0 | 50.0 |
| Fraction of toluene insoluble substances in the, % | 22.0 | 33.6 | 54.0 | 29.3 | 25.6 | 27.1 | 25.8 | 38.0 |
| The onset wetting temperature, ° C. | 105 | 140 | —* | 260 | 205 | 230 | —* | |
| Thermal analysis: Mass loss, (%) in the range | | | | | | | | |
| up to 360° C. | 21.0 | 9.0 | 6.5 | 8.4 | 14.8 | 13.0 | 11.5 | 12.9 |
| 360–480° C. | 32.6 | 24.8 | 23.7 | 25.4 | 27.6 | 28.2 | 28.8 | 28.8 |
| 480–620° C. | 5.6 | 9.7 | 6.5 | 8.7 | 9.3 | 8.8 | 9.3 | 7.5 |
| Coke residual at 800° C., % | 39.4 | 52.1 | 63.3 | 56.0 | 46.9 | 46.8 | 49.6 | 50.2 |
| Mesophase formation temperature ° C. | 520 | 500 | 510 | 505 | 515 | 510 | 495 | 515 |
| Molecular weight distribution: | | | | | | | | |
| a) Mw, a.e.m. | 327 | 554 | 421 | 551 | | | | |
| δ) Mn, a.e.m. | 234 | 329 | 297 | 359 | | | | |
| Content of substances with molecular weight under 300 a.m.u., % | 80.0 | 26.1 | 28.4 | 21.8 | | | | |
| Mw/Mn | 1.40 | 1.58 | 1.39 | 1.53 | | | | |

*No wetting at 120–280° C. is observed.

It is seen from Table A that the petroleum pitch is similar to the coat tar pitch in the α-fraction content, basic temperature ranges of mass loss, molecular weight distribution, and mesophase formation temperature, superior in the coke residue yield and somewhat inferior in the wetting characteristics. The addition of the medium pitch in the amount of 30–50 wt. % to the petroleum pitch improves wetting characteristics but does result in the loss in coke residue. The properties of industrial mixtures of pitches 1 and 4 (coke residue yield, α-fraction content, mesophase transition temperature, thermal decomposition behavior) are similar to laboratory sample mixture 6 and experimental coal tar pitch 2, but are inferior to the latter in wetting characteristics because mechanical stirring on comilling failed to provide the averaging effect in a mixture composition.

At the same time, molecular weight distribution in the petroleum pitch is quite close to that in the experimental coal tar pitch 2, both in the average molecular weight values (Mw and Mn) and low molecular compounds fraction of the total mass. Thermal decomposition behaviors (FIG. 1) and temperature ranges of mesophase transition in these pitches are also close between themselves which allows us to suggest the use of the petroleum pitch per se without medium pitch additions in the TMP process.

In an effort to study the effect of pitch nature on forming the structure and properties of a "primary" matrix in the TMP process, interactions between samples of petroleum and coal tar pitches and their mixtures with carbon fibers heat treated at 1000° C. and VPR-19C carbon fibers heat treated at 2800° C., were investigated. Pitches 2 and 4 and pitch mixtures 5–8 were used for the investigation. Fiber weight fractions in the compositions were 60%. Characteristics of the compositions are presented in Table B.

The caking index, defined as the coke residue gain in a composition (ΔK %) relative to the coke residue yield from the unreinforced pitch, was measured as an indication of the interaction between the fiber and pitch. Mass loss changes in the temperature range from 20 to 800° C. were also determined and compared to those in pure pitches.

As evident from Table B, the highest coke residue gain (see ΔK %) in the presence of carbonized fibers was obtained in the composition containing experimental coal tar pitch 2, whereas the highest coke residue yield (see coke residue %) was reached in the composition based on petroleum pitch 4. Among pitch mixtures, the best results in terms of coke residue yield were obtained in the composition prepared with pitch mixture 6. In the composition containing VPR-19C graphitized carbon fibers and pitch 4, due to the increased mass loss in the temperature ranges up to 360° C. and from 480 to 620° C., the coke residue yield was higher than in the pure pitch but lower than in the composition with carbonized fibers.

Figure 2:
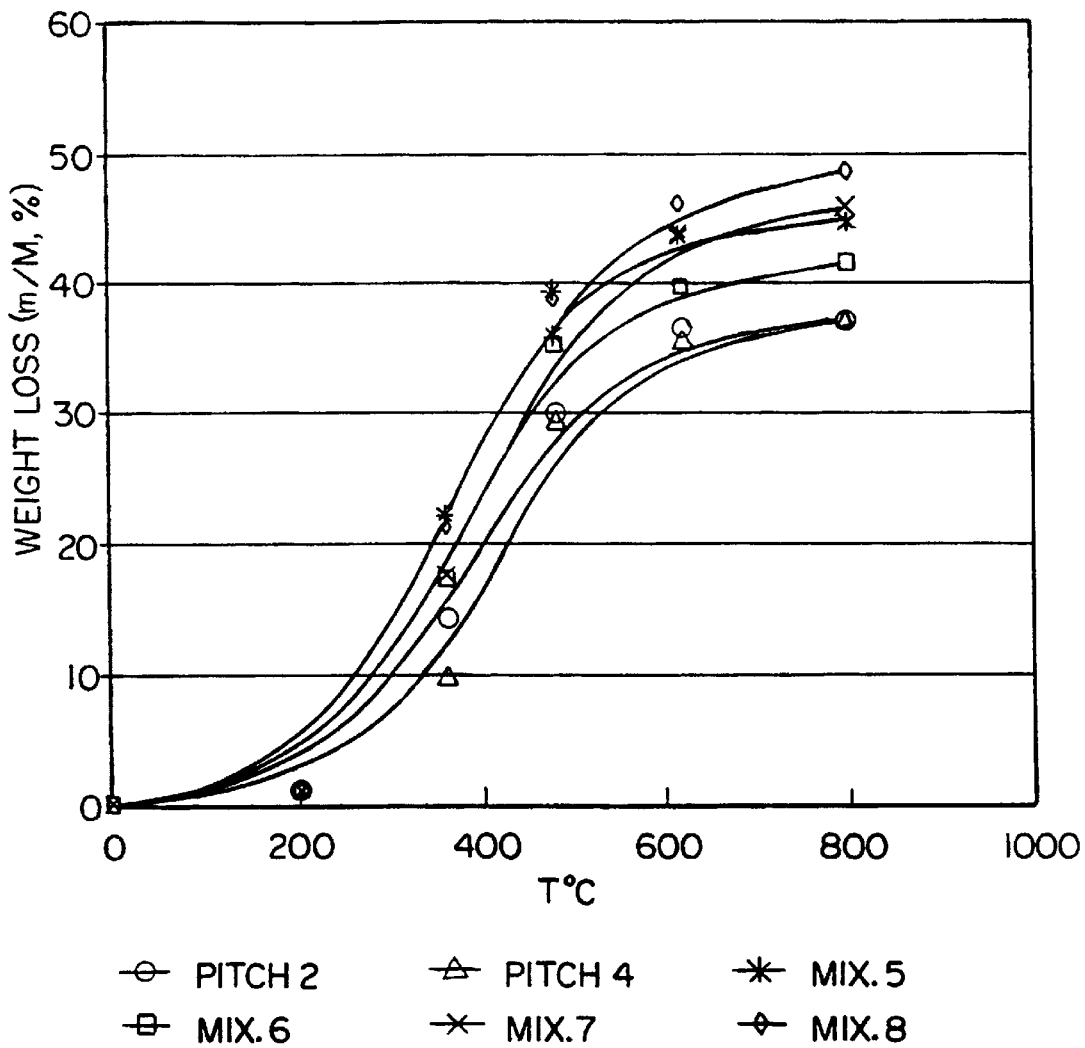
FIG. 2 is a graph of the thermal decomposition of pitches and low temperature carbon fiber mixtures.

It should be noted that the use of coal tar pitch mixture 8 as a matrix in compositions prepared with carbonized fibers provides a lowering of the softening point, a decrease in the α-fraction content, and improved wettability of the pitch but gives no gain in the coke residue compared to the petroleum pitch and its mixtures (Table B, FIG. 2).

Figure 3:
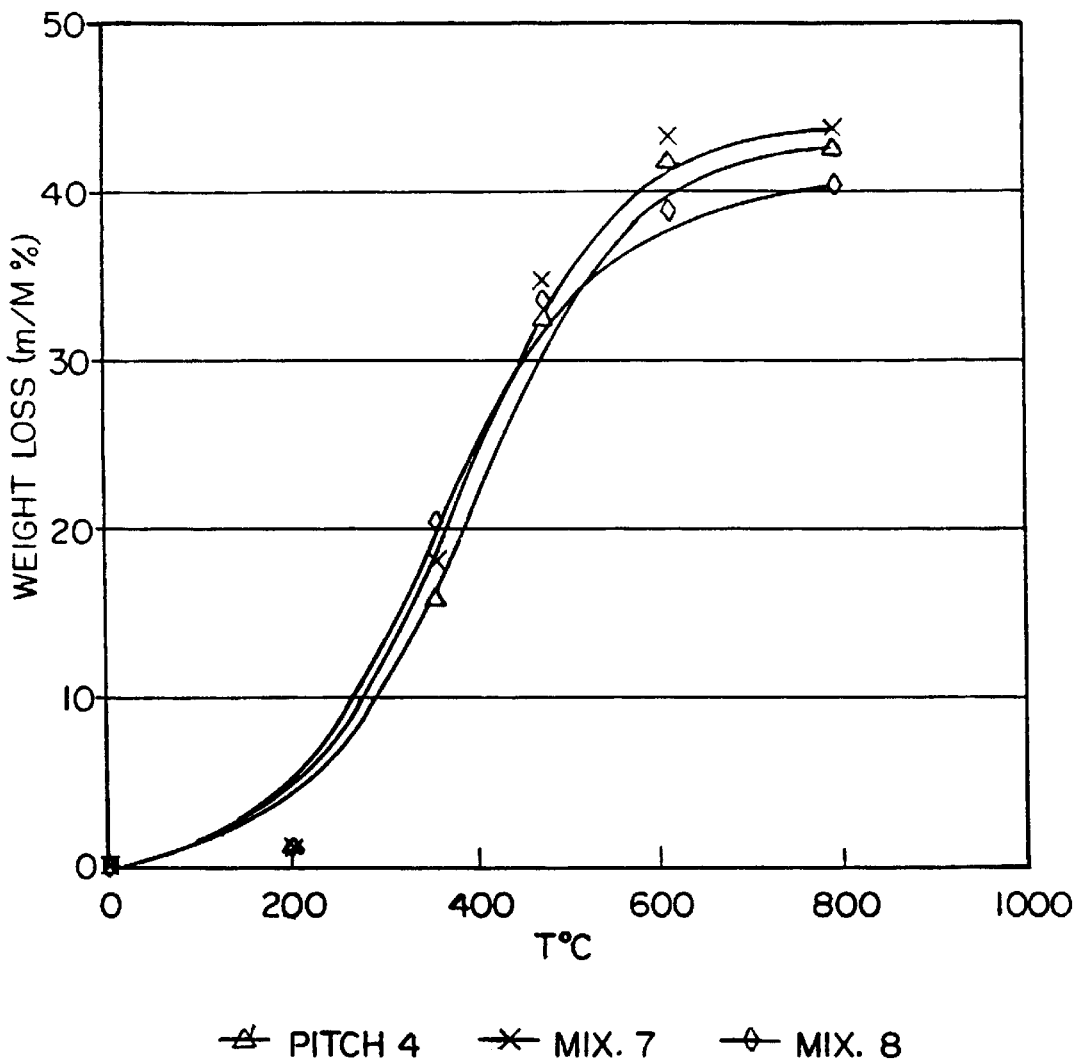
FIG. 3 is a graph of the thermal decomposition of pitches and high temperature carbon fiber mixtures.

In compositions reinforced with the VPR-19C graphitized PAN fiber, the coal tar pitch mixture 8 exhibited higher coke yield and caking index compared to pitch 4 and pitch mixture 7 (see FIG. 3).

These results indicate that the experimental coal tar pitch with increased softening point (pitch 2), petroleum pitch with Ts=140° C. and coke residue yield of at least 56 wt % (pitch 4) and mixtures of the latter with medium coal tar pitch in the ratio of about 60:40 (pitch mixture 7), exhibit attractive properties when mixed with carbonized and graphitized carbon fibers under TMP process conditions.

Pitch mixture 8 can be used in compositions with graphitized fibers.

TABLE B

Properties of pitch-fiber compositions

| Properties | Compositions with pitch samples | | | | | |
|---|---|---|---|---|---|---|
| | 2 | 4 | 5 | 6 | 7 | 8 |
| Carbonized fibers of VPR-19C type, ΔK % Thermal analysis: Mass loss, % in the temperature range, ° C. | 17.2 | 8.0 | 15.7 | 12.0 | 10.8 | 11.3 |
| up to 360 | 15.9 | 9.3 | 21.6 | 17.3 | 17.5 | 21.3 |
| 360–480 | 15.4 | 19.6 | 17.7 | 17.8 | 18.1 | 17.4 |
| 480–620 | 6.2 | 6.2 | 4.0 | 4.4 | 8.2 | 7.4 |
| Coke residue at 800° C., % | 61.1 | 62.8 | 55.1 | 58.5 | 54.2 | 51.4 |
| Graphitized fibers of VPR-19C type, ΔK % Thermal analysis: Mass loss, % in the temperature range, ° C. | | 7.2 | | | 11.6 | 14.7 |
| up to 360 | | 15.4 | | | 18.1 | 20.4 |
| 360–480 | | 17.1 | | | 16.6 | 13.1 |
| 480–620 | | 9.3 | | | 8.5 | 5.3 |
| Coke residue at 800° C., % | | 57.3 | | | 56.3 | 59.6 |

The optimum composition of the green preform used in the TMP process requires evaluation of the friction and wear performance of the final product as well as technical and economic considerations.

Previous investigations have indicated that that the highest friction characteristics are offered by high modulus graphitized fibers. However, the use of carbonized fibers is advantageous due to their low cost. Therefore, the following fibers were used as a reinforcing filler for the model friction carbon-carbon composite material:

Type 1. PAN fiber VPR-19C, heat treatment temperature To≅2800° C., the average density, α=1.92 g/cm$^3$, fiber length L<0.5 mm Type 2. PAN fiber VMN-4, heat treatment temperature To≅2000° C., the average density α=1.70 g/cm$^3$, fiber length L=30–40 mm.

Type 3. Carbonized PAN fibers, heat treatment temperature To≅1000° C., the average density α=1.77 g/cm$^3$, fiber length L=20–30 mm.

All the fibers were derived from PAN fibers. "Green bodies" of the Termar type materials were used for the development of TMP. "Termar" is a tradename for carbon-carbon composite friction material developed by NIIgrafit and produced at the Electrode Plant, both in Moscow, Russia.

Six versions of green bodies were produced from the selected types of fibers and pitches and their mixtures using conventional fabrication methods. The weight ratio of binder (pitch): filler (fiber) for the premix was 0.40:0.60 in case of short cut fibers (Type 1), and 0.5:0.5 in case of long fibers, respectively. To determine the actual carbon fiber-:pitch matrix ratio in the green body appeared to be difficult. Sample discs of 126 mm diameter and 25–40 mm thick were cut from full-scale discs of the Termar type material of the dimensions: outer diameter 490 mm, inner diameter 230 mm, thickness 25–40 mm. Eight samples were made from one full-scale disc. The apparent density and volume of the samples were determined via hydrostatic weighing.

The samples were then subjected to a thermomechanical pressing ("TMP"), as described below, in a special metal mandrel fitted with an external electric heating. The mandrel capacity for one charge was 5–6 samples.

Figure 4:
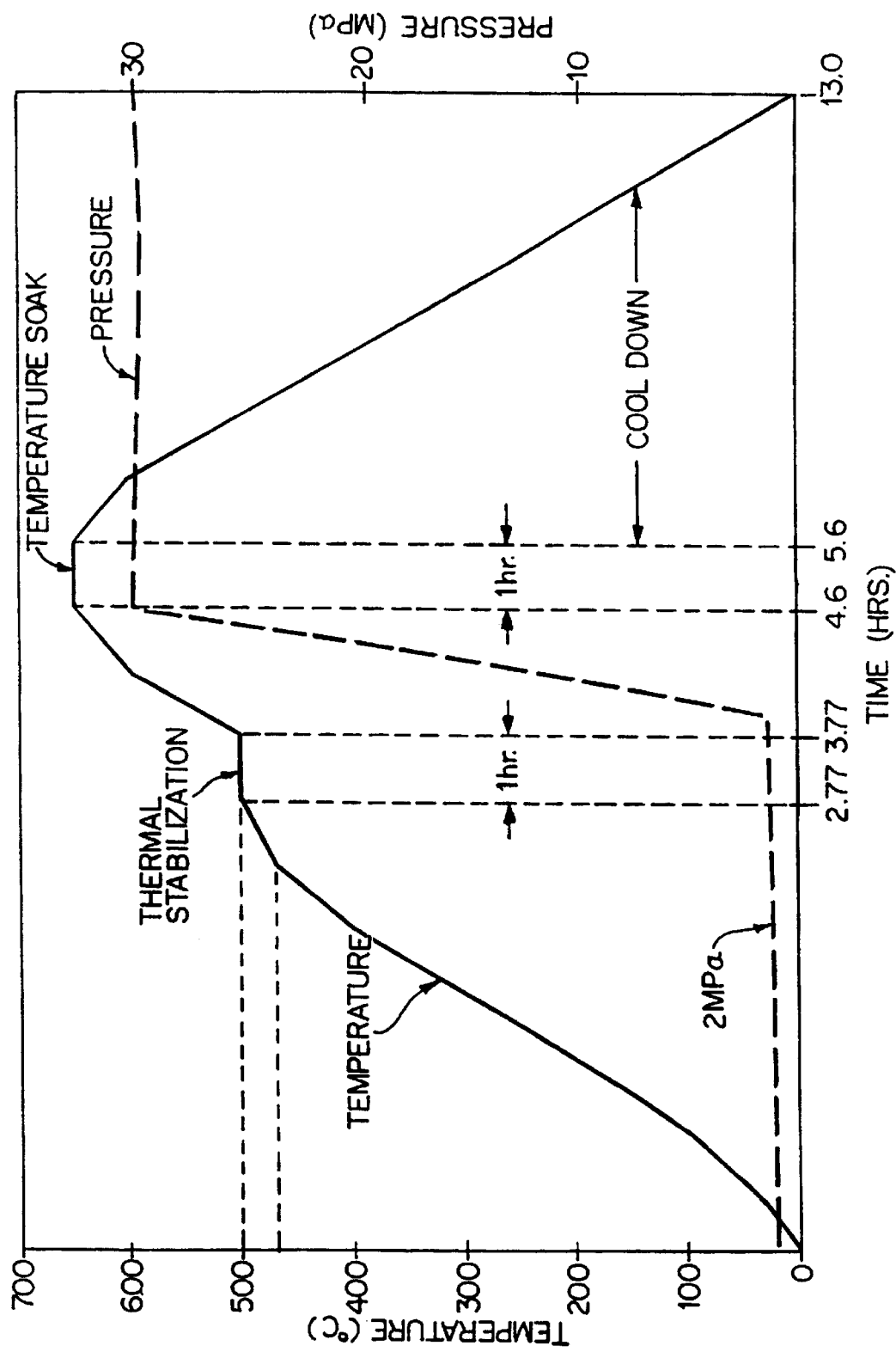
FIG. 4 is a graph of the temperature/pressure/time profile used during the TMP process.

The green preform samples were heated at an arbitrary rate (such as 3° C./min.) to approximately 470° C., after which the temperature was increased at a heating rate of 1° C./minute. In order to thermally stabilize the pitch, the preform was held at a stabilization temperature within the range of 450–520° C. for a soak time, for example, of one-half to one hour, to reduce the volatile content and increase the viscosity of the matrix pitch during the application of pressure. The volatiles content of the pitch can determine the soak temperature and time. Thermal stabilization is accomplished at a low pressure (for example, about 1–3 MPa). Upon attaining approximately 520° C., the samples were subjected to a mechanical pressurization within the range of 25–40 MPa (this increased pressurization can be done, for example, in 10–20 minutes). The samples continued to be heated to a temperature of 600±20° C. and maintained at that temperature for a period of time, for example a 1.5–2 hours soak, the specific pressure being 25–37.5 Mpa, in order to remove volatiles and convert the pitch to a solid carbon. The temperature at the soak is envisioned to be within the range of 520–1000° C. Pressure was maintained during the cooling of the samples which was through natural cooling. See FIG. 4 which illustrates the typical temperature, pressure, and time profile for the TMP process.

The samples were removed from the mandrel, and their mass, volume, and apparent density were determined. The mass loss during TMP was calculated as follows:

$$\Delta P = (Pi - Pf) * 100\% / Pi, \quad (1)$$

where

Pi is the initial sample mass,

Pf is the final sample mass after TMP, and the volume shrinkage after TMP was calculated as follows:

$$\Delta V = (Vi - Vf) * 100\% / Vi, \quad (2)$$

where

Vi is the initial sample volume,

Vf is the final sample volume after TMP. The results are presented below in Table C

TABLE C

Characterization of various types of composites after TMP.

| Composition of a material<br>Technological features of TMP | Average density of initial sample $d_k$, g/cm$^3$ | Average density of sample after TMP $d_k$, g/cm$^3$ | Mass loss $\Delta$ P, % | Volume shrinkage $\Delta$ V, % |
|---|---|---|---|---|
| Version 1<br>Fiber Type 1 + pitch mixture 8<br>P = 25 MPa<br>without thermal stabilization | 1.334 ± 0.075 | 1.44 ± 0.026 | 15.8 ± 3.8 | 22.2 ± 4.3 |
| Version 2<br>Fiber Type 1 + pitch 2<br>P = 25 MPa<br>without thermal stabilization | 1.400 ± 0.051 | 1.457 ± 0.020 | 21.3 ± 2.9 | 24.4 ± 2.5 |
| Version 3<br>Fiber Type 1 + pitch 2<br>P = 25 MPa<br>without thermal stabilization | 1.434 ± 0.028 | 1.55 ± 0.025 | 21.1 ± 3.7 | 27.0 ± 3.9 |
| Version 4<br>Fiber Type 1 + pitch 2<br>P = 37.5 MPa<br>with thermal stabilization | 1.437 ± 0.01 | 1.638 ± 0.029 | 17.8 ± 2.4 | 27.9 ± 1.7 |
| Version 5<br>Fiber type 2 + pitch 2<br>P = 25 MPa<br>with thermal stabilization | 1.391 ± 0.031 | 1.470 ± 0.019 | 18.8 ± 7.5 | 23.2 ± 5.5 |
| Version 6<br>Fiber Type 3 + mixture 7<br>P = 25 MPa<br>with thermal stabilization | 1.256 ± 0.09 | 1.363 ± 0.033 | 19.6 ± 6.9 | 26.1 ± 6.4 |

The main purpose of this work was to develop and determine the efficiency of the TMP method, and to consider the affect of various process and material parameters on the TMP process. The experiments conducted have shown that TMP is realizable, i.e., it is practicable to obtain, at an accelerated rate, carbon-carbon composite materials of 1.5–1.65 g/cm$^3$ density using no modifying additives and with relatively inexpensive equipment. The present invention comprises composites or preforms with a high density of 1.2 gm/cm$^3$ or greater which can be obtained according to the desired end application. Such preforms can comprise a carbon-carbon composite, with or without graphitization heat treatment, as an end product for desired applications.

Comparison of the versions of combining carbon fibers with matrix pitches, from the viewpoint of obtaining green bodies, has shown that the mixture for versions 2, 3, 4 (fiber type 1+pitch 2) is the most useful composition. The density variation for the green body is within 2–4%.

Furthermore, it should be pointed out that properties of the starting pitch material and the filler used, as noted above, markedly affect the carbon-carbon composite material quality and density after TMP. The best results were obtained using a fine-dispersion filler fiber (Type 1) which has not only a higher density and a larger surface due to grinding, but also a higher specific surface area conditioned by a high heat treatment temperature. These parameters appear to be important for the process of combined (fiber/matrix) caking under TMP.

Comparison of the experimental results have shown that TMP with thermal stabilization of the pitch (versions 3–5) is more efficient than the processes without thermal stabilization predominantly because of the prevention of bloating. As follows from considering the reasons of this phenomenon, the coke yield after TMP with the thermal stabilization exposure is not substantially different as compared to the control processes without thermal stabilization. This is evident from the mass loss index $\Delta$ P which indirectly reflects the carbon solid residue. The closeness of the $\Delta$ P values for all versions of the investigated compositions and conditions of processing is explained by the fact that the conditions of TMP do not inhibit a free evolution of volatiles under polycondensation and pyrolysis of each pitch type. Thus, the coke yield during TMP depends predominantly on properties of the initial pitch and fibers used.

It is our opinion that the efficiency of the thermal stabilization exposure or soak resides in increasing the viscosity throughout the sample. The viscosity increase during thermochemical transformations makes it possible to decrease the amount of pitch being squeezed out of a sample under pressure, to decrease the composite porosity level, and thus prevent bloating.

Accordingly, the purpose of the TMP process optimization was to find a temperature-time region during or after the pitch thermal stabilization wherein the pressure application would not cause binder to be squeezed out of a preform and would be applied to a material which did not lose its ability to cake. The test results show that the purpose has been best attained for the compositions based on pitch 2 (Versions 3–5).

As regards the pressure effect on the material quality, it was found that the optimal results were obtained when using pressure of about 25 Mpa. The pressure increase in TMP led to the density increase, as seen from Table B (Version 4), however at the same time the number of defects in the final material grew in the form of cracks, delaminations and voids which can be explained by the extreme increase of the fiber content and stresses arising at considerable strains of the high-modulus reinforcing fibrous filler.

The use of TMP for the composition: fiber type 3+ mixture 7 (Version 6) should be considered separately. The behavior of green preforms comprised of petroleum and coal tar pitch mixtures and carbonized fibers employed as the filler made it impossible to obtain high-quality green semi-products by conventional methods. The green bodies' initial low density (on some samples 0.9–1.0 g/cm$^3$) owing to an insufficient pitch impregnation brought about additional difficulties in the TMP. Because Version 6 includes pitches of different origins, difficulties resulted from the incompatability of the pitches' pyrolysis and thermal stabilization characteristics. This prevented the obtaining of results reflecting the potentialities of Version 6. For Version 6, new approaches are required in order to obtain green bodies and for the optimization of the thermal stabilization conditions during TMP.

We claim:

1. A method of producing rapidly a high density, partially porous preform for subsequent densification and made from a green preform comprising carbon fibers and at least one pitch, comprising the steps of:
   (a) heating the green preform to a temperature in the range of approximately 450–520° C.;
   (b) holding at a temperature within the range of 450–520° C. in order to effect a desired mesophase content and density including porosity;
   (c) pressing the preform at 520° C. or higher;
   (d) heating the preform to within the range of 520° C.–1,000° C. followed by a soak; and
   (e) cooling the preform.

2. The method of claim 1, wherein the heating in step (d) is to 600±20° C.

3. The method of claim 1, wherein the fibers comprise PAN fibers.

4. The method of claim 1, wherein the pitch comprises a coal tar pitch with elevated softening temperature above 90° C.

5. The method of claim 1, wherein the high density preform has a density in the range of 1.2–1.65 g/cm$^3$.

6. The method of claim 1, wherein the temperature is held for up to one hour in step (b).

7. The method of claim 1, wherein the temperature is increased at a rate of 1° C./minute up to the range in which the temperature is held in step (b).

8. The method of claim 1, wherein the preform is pressed in step (c) to a pressure within the range of 25–40 MPa.

9. The method of claim 8, wherein the pressure is maintained within the range of 25–40 MPa during cooling.

10. The method of claim 1, wherein the green preform is made from combining the carbon fibers and pitch prior to the heating of step (a).

11. The method of claim 1, wherein the pitch comprises less than 100% converted mesophase pitch.

12. A method of producing rapidly a high density, partially porous preform for subsequent densification and made from a green preform comprising carbon fibers and at least one pitch, comprising the steps of:
   (a) heating the green preform to a temperature in the range of approximately 450 to 520° C.;
   (b) holding at a temperature within the range of 450–520° C. in order to effect a desired mesophase content and density;
   (c) pressing the preform at 520° C. or higher;
   (d) heating the preform to within the range of 520° C.–1,000° C. followed by a soak of approximately 1.5 to 2 hours; and
   (e) cooling the preform.

* * * * *